United States Patent
Schenck et al.

(10) Patent No.: US 6,764,753 B2
(45) Date of Patent: Jul. 20, 2004

(54) SMOKABLE FILMS COMPRISING A POLYAMIDE AND A COPOLYESTER ELASTOMER

(75) Inventors: Heiko E. Schenck, Eppstein (DE); Dagmar Laue, Nyon (CH); Yannick Albertone, Gex (FR)

(73) Assignee: E. I. du Pont de Nemours and Company, Wilmington, DE (US)

(*) Notice: Subject to any disclaimer, the term of this patent is extended or adjusted under 35 U.S.C. 154(b) by 74 days.

(21) Appl. No.: 10/119,884

(22) Filed: Apr. 10, 2002

(65) Prior Publication Data

US 2003/0055181 A1 Mar. 20, 2003

Related U.S. Application Data

(60) Provisional application No. 60/282,890, filed on Apr. 11, 2001.

(51) Int. Cl.[7] .................................. B29D 22/00
(52) U.S. Cl. .................. 428/220; 264/209.5; 264/632
(58) Field of Search .................. 428/220; 264/632, 264/209.5; 525/425

(56) References Cited

U.S. PATENT DOCUMENTS

| | | |
|---|---|---|
| 3,784,520 A | 1/1974 | Hoeschele |
| 3,968,183 A | 7/1976 | Hayashi et al. |
| 4,070,417 A | 1/1978 | Isaka et al. |
| 4,659,599 A | 4/1987 | Strutzel |
| 4,944,970 A | 7/1990 | Stenger et al. |

FOREIGN PATENT DOCUMENTS

| | | | |
|---|---|---|---|
| DE | 3426723 A1 | | 2/1985 |
| EP | 0155541 A2 | | 9/1985 |
| EP | 0176980 A2 | | 4/1986 |
| EP | 0325151 A2 | | 7/1989 |
| JP | 51-23567 | * | 2/1976 |
| JP | 4314741 | | 11/1992 |
| JP | 11-323109 | * | 11/1999 |
| JP | 2000-191894 | * | 7/2000 |

* cited by examiner

*Primary Examiner*—Ana Woodward

(57) ABSTRACT

Smokable films, in particular tubular films, comprising i) an aliphatic polyamide and ii) a block copolyetherester elastomer are provided. A process for manufacturing these films is also provided. The films of the invention show excellent water vapor permeability at high temperatures and barrier properties at room temperature. They are suitable for preparation of tubular casings, in particular smoked foodstuff casings.

14 Claims, No Drawings

SMOKABLE FILMS COMPRISING A POLYAMIDE AND A COPOLYESTER ELASTOMER

This application claims the benefit of U.S. Provisional Application No. 60/282,890, filed Apr. 11, 2001, which is incorporated herein by reference for all purposes.

BACKGROUND OF THE INVENTION

1. Field of Invention

This invention relates to a smokable synthetic film, preferably in the form of a tubular casing. This film can be used for encasing foodstuffs, in particular sausages, meat, cheese.

2. Background Discussion and Related Art

Generally, foodstuff casings are made either of natural material such as cellulose or animal guts, or of synthetic material. Usually, the foodstuff is packed into the casing. When smoked products are desired, the encased foodstuff is further subjected to a smoking process. The product is suspended into a chamber wherein hot smoke is processed. This process has the disadvantage that it can only be used with natural casings such as guts, or with cellulose or collagen casings which all show a natural permeability to gas, and therefore to smoke.

A critical point in the preparation and storage of smoked products is that the casings must show different permeabilities depending on the step of the process. A high permeability is needed at high temperatures (typically between 50 and 100° C.) and high humidity, during the smoking process. Once the product is smoked and cooled, it is preferable that the casing acts as a barrier against humidity: so the permeability should preferably be low at temperatures less than 50° C., particularly less than 30° C.

Other important features of casings are their abilities to both stretch and shrink. When subjected to heat treatment, the volume of the filling of the casing increases. Because of its stretchability, the casing extends. But after cooling, the volume of filling decreases and the casing must be able to shrink in a way that the final product is free of wrinkles. It is also important that no jelly forms out of the casing when cooling down.

Natural guts and cellulose present many disadvantages : they are expensive, their great permeability to steam causes great weight losses, the stability of the product is limited with regard to drying, superficial fat oxidation and graying caused by microbial spoiling often appear on casings.

CA 1 235 018 discloses synthetic smokable films comprising polyamides. But these films do not have a satisfactory water vapor permeability.

It still remains problematic to realize synthetic smokable films, easy to use, for foodstuff casings, showing a high permeability at high temperatures and a low permeability around room temperature.

Now, it has been surprisingly found that the combination of two specific types of polymers in an oriented film lead to a film showing excellent properties as regards water vapor permeability at high temperatures, excellent properties as regards barrier properties at room temperature and excellent properties as regards mechanical resistance (such as toughness, dimensional stability).

A first aspect of the invention is an oriented film comprising i) an aliphatic polyamide and ii) a block copolyetherester elastomer.

A second aspect of the invention is a tubular casing comprising the above film.

Another aspect of the invention is a process of manufacturing an oriented film comprising the steps of:

1) providing a composition comprising i) an aliphatic polyamide and ii) a block copolyetherester elastomer,
2) extruding an extrudate of composition of step 1),
3) quenching and orienting the extrudate of step 2) in at least one direction.

Another aspect of the invention is a process of manufacturing a tubular film comprising the steps of:

1) providing a composition comprising i) an aliphatic polyamide and ii) a block copolyetherester elastomer,
2) processing the composition of step 1) through double bubble extrusion to obtain an oriented blown film.

The film of the invention shows excellent water vapor permeability at high temperatures, say for temperatures ranging from 50° C. to 100° C., and barrier properties at lower temperatures, particularly room temperature, say for temperatures between 20° C. and 25° C. Thanks to the film of the invention, it is now possible to smoke products very efficiently: the high water vapor permeability of the film at high temperatures allows the smoke to go through the film and come in contact with the product during the smoking process. On another hand, because of the barrier properties of the film at room temperature, no humidity is lost when the product is cooled. Thanks to the shrinkability of the film of the invention, no wrinkle appear on the casing after cooling down the product.

The films of the invention can find use in casings for smoked foodstuffs. This includes sausage casings, but also meat and/or cheese casings. The films of the invention can also find use in the roofing field as well as for clothing.

The first essential component of the film of the invention is an aliphatic polyamide. By "aliphatic polyamide" is meant herein aliphatic polyamides, aliphatic copolyamides, blends and mixtures thereof. Preferred aliphatic polyamides for use in the invention are polyamide 6, polyamide 6.66, blends and mixtures thereof. Polyamides 6.66 are commercially available under the tradenames "Ultramid C4", "Ultramid C35" from BASF, Germany, or under the tradename "Ube5033FXD27" from Ube Industries Ltd. Polyamide 6 is commercially available under the tradename Nylon 4.12 from E.I. du Pont de Nemours and Company, Delaware.

In a preferred embodiment of the invention, the aliphatic polyamide has a viscosity ranging from about 140 to about 270 cubic centimeters per gram ($cm^3/g$) measured according to ISO307 at 0.5% in 96% $H_2SO_4$.

The aliphatic polyamide is usually present in the film of the invention in an amount from about 50 weight % to about 99.9 weight %, preferably from about 70 weight % to about 99.9 weight %, relative to the weight of the film.

The film may further comprise other polyamides such as those described in U.S. Pat. Nos. 5,408,000; 4,174,358; 3,393,210; 2,512,606; 2,312,966 and 2,241,322, which are incorporated herein by reference. The film may also comprise partially aromatic polyamides. A suitable partially aromatic polyamide is the amorphous copolyamide 6-I/6-T of the following formula:

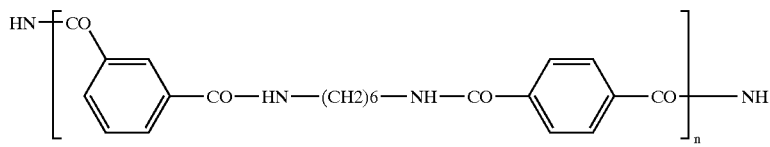

Some suitable partially aromatic copolyamides for use in the present invention are the amorphous nylon resins 6-I/6-T commercially available under the tradename Selar® PA from E.I. du Pont de Nemours and Company or commercially available under the tradename Grivory® G 21 from EMS-Chemie AG.

The second essential component of the invention is a block copolyetherester elastomer.

The copolyetherester(s) are generally hydrophilic, as described in more detail below.

The viscosity of the copolyetheresters is preferably less than about 3000 pascal seconds (Pa.s) and preferably at least 20 Pa.s, measured according to the standard ISO11443. Preferably, the viscosity is in the range from about 20 to about 2000 Pa.s, more preferably from about 40 to about 1000 Pa.s, and more preferably from about 50 to about 700 Pa.s, measured according to the standard ISO11443. The viscosity in Pa.s is measured according to the standard ISO 11443 as a function of shear rate in $sec^{-1}$ and temperature. The temperatures used in the measurement of viscosity are from a minimum of just above the melting (or softening) point of the polymer up to a maximum of just above the temperatures used in the processing methods (for example, coextrusion, injection molding and lamination, blown film extrusion) of thermoplastic materials. The temperatures used in the processing of thermoplastics are generally from about 20 to about 50° C., and particularly from about 40 to about 50° C., above the melting point of the thermoplastic. The shear rates used in the measurement of viscosity were from about 10 to about 10000 $sec^{-1}$, which encompass those typically encountered in the processing methods of thermoplastic materials.

Preferably, the melting point of the copolyetheresters is greater than 120° C., usually from about 120° C. to above about 220° C. The melting points are determined by differential scanning calorimetry (DSC) in accordance with the standard ISO 3146.

In one embodiment of the invention, the copolyetheresters are selected from those described in U.S. Pat. No 4,725,481, the disclosure of which is incorporated herein by reference.

In a preferred embodiment, the copolyetheresters have a multiplicity of recurring long-chain ester units and short-chain ester units joined head-to-tail through ester linkages, said long-chain ester units being represented by the formula:

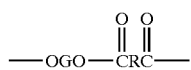 (I)

and said short-chain ester units being represented by the formula:

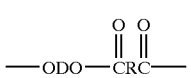 (II)

wherein

G is a divalent radical remaining after the removal of terminal hydroxyl groups from a poly(alkylene oxide) glycol having an average molecular weight of about 400–3500, wherein the amount of ethylene oxide groups incorporated in said one or more copolyetheresters by the poly(alkylene oxide)glycol is from about 20 to about 68 weight percent, preferably from about 25 to about 68 weight percent, based upon the total weight of the copolyetherester(s);

R is a divalent radical remaining after removal of carboxyl groups from a dicarboxylic acid having a molecular weight less than about 300; and D is a divalent radical remaining after removal of hydroxyl groups from a diol having a molecular weight less than about 250; and wherein said copolyetherester(s) contain from about 25 to about 80 weight percent short-chain ester units.

It is preferred that said copolyetherester(s) have a moisture vapor transmission rate according to ASTM E96-66, Procedure BW, ($MVTR_{96}$) of at least about 1200, preferably from about 1200 to about 20000, $gm.mil/m^2/24$ hrs.

The invention will now be described with reference to the copolyetherester(s) of the preferred embodiment.

As used herein, the term "ethylene oxide groups incorporated in the copolyetherester(s)" means the weight percent in the total copolyetherester(s) of ($CH_2$—$CH_2$—O—) groups in the long-chain ester units. The ethylene oxide groups in the copolyetherester that are counted to determine the amount in the polymer are those derived from the poly(alkylene oxide)glycol and not ethylene oxide groups introduced into he copolyetherester by means of a low molecular weight diol.

As used herein, the term "long-chain ester units" as applied to units in a polymer chain refers to the reaction product of a long-chain glycol with a dicarboxylic acid. Suitable long-chain glycols are poly(alkylene oxide)glycols having terminal (or as nearly terminal as possible) hydroxy groups and having a molecular weight of from about 400 to about 3500, particularly from about 600 to about 1500.

The poly(alkylene oxide)glycols used to make the copolyetheresters should contain ethylene oxide groups in amounts that result in a copolyetherester having from about 20 to about 68, preferably from about 25 to about 68, more preferably from about 30 to about 55, weight percent ethylene oxide groups, based on the total weight of the copolyetherester. Random or block copolymers of ethylene oxide containing minor portions of a second poly(alkylene oxide) glycol can be used. Generally, if a second monomer is present, the second monomer will constitute less than about 30 mol percent of the poly(alkylene oxide)glycols, and usually less than about 20 mol percent. Representative long-chain glycols include poly(ethylene oxide)glycol, ethylene-oxide capped polypropylene oxide glycol, mixtures of poly(ethylene oxide)glycol with other glycols such as ethylene oxide capped poly(propylene oxide)glycols and/ or poly(tetramethylene oxide)glycol provided the resulting copolyetherester has an amount of ethylene oxide groups of at least about 25 weight percent. Copolyetheresters prepared from poly(ethylene oxide)glycols having a molecular weight of from about 600 to 1500 are preferred.

The term "short-chain ester units" as applied to units in a polymer chain of the copolyetheresters refers to low molecular weight compounds or polymer chain units having molecular weights less than about 550. They are made by reacting a low molecular weight diol or a mixture of diols (MW below about 250) with a dicarboxylic acid to form ester units represented by Formula (II) above.

Included among the low molecular weight diols which react to form short-chain ester units suitable for use for preparing copolyetheresters are acyclic, alicyclic and aromatic dihydroxy compounds. Preferred compounds are diols with 2–15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2–8 carbon atoms, most especially 1,4-butanediol. Included among the bisphenols which can be used are bis(p-hydroxy) diphenyl, bis (p-hydroxyphenyl)methane, and bis(p-hydroxyphenyl)propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol and not to its derivatives.

Dicarboxylic acids which are reacted with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes acid equivalents of dicarboxylic acids having two functional carboxyl groups which perform substantially like dicarboxylic acids in reaction with glycols and diols in forming copolyetherester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyetherester polymer formation and use of the polymer in the compositions of this invention.

The term "aliphatic dicarboxylic acids", as used herein, means carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used are sebacic acid, 1,3-cyclohexane dicarboxylic acid, 1,4-cyclohexane dicarboxylic acid, adipic acid, glutaric acid, 4-cyclohexane-1,2-dicarboxylic acid, 2-ethylsuberic acid, cyclopentanedicarboxylic acid decahydro-1,5-naphthylene dicarboxylic acid, 4,4,'-bicyclohexyl dicarboxylic acid, decahydro-2,6-naphthylene dicarboxylic acid, 4,4,'-methylenebis(cyclohexyl) carboxylic acid, 3,4-furan dicarboxylic acid. Preferred acids are cyclohexane-dicarboxylic acids and adipic acid.

Representative aromatic dicarboxylic acids include phthalic, terephthalic and isophthalic acids, bibenzoic acid, substituted dicarboxy compounds with two benzene nuclei such as bis(p-carboxyphenyl)methane, p-oxy-1,5-naphthalene dicarboxylic acid, 2,6-naphthalene dicarboxylic acid, 2,7-naphthalene dicarboxylic acid, 4,4,'-sulfonyl dibenzoic acid and $C_1$–$C_{12}$ alkyl and ring substitution derivatives thereof, such as halo, alkoxy, and aryl derivatives. Hydroxyl acids such as p-(beta-hydroxyethoxy) benzoic acid can also be used providing an aromatic dicarboxylic acid is also present.

Aromatic dicarboxylic acids are a preferred class for preparing the copolyetherester polymers useful for this invention. Among the aromatic acids, those with 8–16 carbon atoms are preferred, particularly terephthalic acid alone or with a mixture of phthalic and/or isophthalic acids.

The copolyetheresters contain about 25–80 weight percent short-chain ester units corresponding to Formula (II) above, the remainder being long-chain ester units corresponding to Formula (I) above. When the copolyetheresters contain less than about 25 weight percent short-chain ester units, then the crystallization rate becomes very slow and the copolyetherester is tacky and difficult to handle. When more than about 80 weight percent short-chain ester units are present, then the copolyetheresters generally become too stiff. The copolyetheresters preferably contain about 30–60, preferably about 40–60, weight percent short-chain ester units the remainder being long-chain ester units. In general, as percent short-chain ester units in the copolyetherester are increased, the polymer has a higher tensile strength and modulus, and the moisture vapor transmission rate decreases. Most preferably, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-phenylene radicals and D groups which are not 1,4-butylene radicals does not exceed 30%. If a second dicarboxylic acid is used to make the copolyetherester, isophthalic acid is the acid of choice and if a second low molecular weight diol is used, 1,4-butenediol or hexamethylene glycol are the diols of choice.

In one preferred embodiment of the invention, the elastomer is a copolyetherester containing 45 weight percent 1,4-butylene terephthalate, and 55 weight percent ethylene oxide/propylene oxide copolyether terephthalate, for which the copoly(alkylene oxide) glycol used is obtained by end-capping poly(propylene ether) glycol with 64 weight percent ethylene oxide, and has a molecular weight of about 2100. The copolyetherester has a calculated ethylene oxide content of 33 weight percent, and contains 45 weight percent short-chain ester units. This copolyetherester has a melting point of 200° C.

In another preferred embodiment of the invention, the elastomer contains 32 weight percent 1,4-butylene terephthalate, 9 weight percent 1,4-butylene isophthalate, 46 weight percent ethylene oxide/propylene oxide copolyether terephthalate, and 13 weight percent ethylene oxide/proplyene oxide copolyether isophthalate. The copoly (alkylene oxide) glycol used to make this copolyetherester is obtained by end-capping poly(propylene ether) glycol with 30 weight percent ethylene oxide, and has a molecular weight of about 2100. The copolyetherester has a melting point of 156° C.

In another preferred embodiment of the invention, the elastomer contains 53 weight percent 1,4-butylene terephthalate, and 47 weight percent ethylene oxide/ propylene oxide copolyether terephthalate. The copoly (alkylene oxide) glycol used to make the copolyetherester is obtained by end-capping poly(propylene ether) glycol with 30 weight percent ethylene oxide, and has a molecular weight of about 2100. The copolyetherester has a melting point of 208° C.

In another preferred embodiment of the invention, the elastomer contains 42 weight percent 1,4-butylene terephthalate, 12 weight percent 1,4-butylene isophthalate, 36 weight percent ethylene oxide/propylene oxide copolyether terephthalate, and 10 weight percent ethylene oxide/proplyene oxide copolyether isophthalate. The copoly (alkylene oxide) glycol used to make the copolyetherester is obtained by end-capping poly(propylene ether) glycol with 30 weight percent ethylene oxide, and has a molecular weight of about 2100. The copolyetherester has a melting point of 170° C.

Block copolyetheresters and their preparation are described in Encyclopedia of Polymer Science and Engineering, Volume 12, pages 76–177 (1985) and the references reported therein.

Suitable block copolyetheresters for use in the present invention are products commercially available from a number of companies under various tradenames, for example Hytrel® of E.I. du Pont de Nemours, Riteflex® of Ticona and Arnitel® of DSM.

The elastomer is usually present in the film of the invention in an amount from about 0.1 weight % to about 50 weight %, preferably from about 5 weight % to about 30 weight %, relative to the weight of the film.

In a preferred embodiment of the invention, the film comprises a polyamide 6.66 and an elastomer which is a copolyetherester containing 45 weight percent 1,4-butylene terephthalate, and 55 weight percent ethylene oxide/propylene oxide copolyether terephthalate.

The film of the invention may also comprise block copolyetheramides. Such block copolyetheramides are commercially available under the tradename "Pebax®" from Elf Atochem.

The film of the invention may comprise the usual additives including plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, antiblock agents, release agents, and/or mixtures thereof.

The film of the invention can be prepared by extrusion as follows: granulates of the various components are melted in a suitable extruder and converted into a film using a converting technique. The granulates of the various components may also be previously melt blended to form a compound which is then converted into a film using a converting technique. Suitable converting techniques are for instance blown film extrusion, cast sheet extrusion, extrusion coating. Preferably, the film of the invention is a blown film obtained through blown film extrusion.

The film of the invention is oriented. In general terms the process comprises the steps of extruding a layer of molten polymer, quenching the extrudate and orienting the quenched extrudate in at least one direction. The film may be uniaxially oriented, but is preferably biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce films of the present invention. Examples of such apparatus and processes are believed to include e.g. those disclosed in U.S. Pat. Nos. 3,278,663; 3,337,665; 4,590,106; 4,760,116; 4,769,421; 4,797,235 and 4,886,634.

In a preferred embodiment of the invention, the film is oriented through a double bubble extrusion process, where simultaneous biaxial orientation may be effected by extruding a primary tube which is subsequently quenched, reheated and then expanded by internal gas pressure to induce transverse orientation, and withdrawn at a rate which will induce longitudinal orientation. More preferably, a primary tube is melt extruded from an annular die. The primary tube can be made by any of the known techniques for extrusion of tubular plastic film including blown film extrusion, coextrusion and coating lamination methods. This extruded primary tube is cooled and collapsed. It is then again heated to its orientation temperature (e.g. by means of a water bath). In the orientation zone a secondary tube is formed by inflation, thus the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film may be reinflated and pass through an annealing step (thermofixation), during which it is heated once more to adjust the shrink characteristics.

The film of the invention preferably has a moisture vapor transmission rate measured according to ASTM E398, at a temperature of 38° C. and a relative humidity of 85% ($MVTR_{98}$) greater than or equal to 100 grams per square meter per 24 hours (g/m$^2$×24 h), more preferably greater than or equal to 200 g/m$^2$×24 h.

The film of the invention preferably has a moisture vapor transmission rate measured according to ASTM F1249 at a temperature of 37.8° C. and a relative humidity of 100%, calculated for a film of 25 microns, ($MVTR_{49}$) greater than or equal to 750 g/m$^2$×24 h.

Preferably, the film of the invention has an E-modulus value, measured as in the examples below, greater or equal to 700 megapascals (Mpa), preferably greater or equal to 1000 MPa.

The film of the invention has preferably a thickness between 10 micrometers ($\mu$m) and 50 $\mu$m, and preferably between 15 $\mu$m and 35 $\mu$m.

The film of the invention may be monolayer or multilayer but is preferably monolayer.

Thanks to the compatibility of the aliphatic polyamide and the block copolyetherester, the film of the invention can be processed on the manufacturing machine at a speed higher than 50 meters per minute (m/min), and up to a speed of 200 m/min. The film of the invention is therefore compatible with high speed machines.

The invention will be further described in the following examples.

Description of Ingredients

Materials used in the Examples set forth below were as follows:

Aliphatic polyamide 1: polyamide 6.66 commercially available under the tradename Ultramid C4 from BASF, and having a viscosity of 250 cm$^3$/g measured according to ISO307 at 0.5% in 96% $H_2SO_4$.

Aliphatic polyamide 2: polyamide 6 having a re-crystallization point of 186° C. measured according to the ASTM D-3418 method, commercially available under the tradename Nylon 4.12 from E.I. du Pont de Nemours and Company, and having a viscosity of 153 cm$^3$/g measured according to ISO307 at 0.5% in 96% $H_2SO_4$.

Aliphatic polyamide 3: polyamide 6.66 commercially available under the tradename Ultramid C35 from BASF, having a viscosity of 195 cm$^3$/g measured according to ISO307 at 0.5% in 96% $H_2SO_4$.

Aliphatic polyamide 4: polyamide 6.66 commercially available under the name Ube 5033 FXD27 from Ube Industries Ltd.

Partially aromatic polyamide 1: amorphous copolyamide 6-I/6-T commercially available under the tradename Selar® PA 3426 from E. I. du Pont de Nemours and Company.

Elastomer 1: was a copolyetherester containing 45 weight percent 1,4-butylene terephthalate, and 55 weight percent ethylene oxide/propylene oxide copolyether terephthalate. The copoly(alkylene oxide) glycol used to make this copolyetherester was obtained by endcapping poly(propylene ether) glycol with 64 weight percent ethylene oxide, and had a molecular weight of about 2100. The copolyetherester had a calculated ethylene oxide content of 33 weight percent, and contained 45 weight percent short-chain ester units. This copolyetherester had a melting point of 200° C.

Elastomer 2: was a copolyetherester containing 42 weight percent 1,4-butylene terephthalate, 12 weight percent 1,4-butylene isophthalate, 36 weight percent ethylene oxide/propylene oxide copolyether terephthalate, and 10 weight percent ethylene oxide/proplyene oxide copolyether isophthalate. The copoly(alkylene oxide) glycol used to make this copolyetherester was obtained by end-capping poly(propylene ether) glycol with 30 weight percent ethylene oxide, and had a molecular weight of about 2100. The copolyetherester had a melting point of 170° C.

Antiblock agent: antiblock agent commercially available under the name MB7361 from EMS

EXAMPLE 1

The following compositions were prepared as dry blends by thoroughly mixing pellets of the two components.

All amounts in Table I are given in parts by weight relative to the total weight of the composition.

TABLE I

| Composition | 1 | 2 | 3 | 4 |
|---|---|---|---|---|
| Aliphatic polyamide 1 | 90 | 80 | 75 | 70 |
| Elastomer 1 | 10 | 20 | 25 | 30 |

A film was prepared from each composition. The films were produced in a typical double bubble process on a mono-layer, horizontal, commercial line from Kuhne Anlagenbau GmbH running at a line speed of approximately 50 m/min. The melt was extruded at a temperature of about 250–255° C. out of an annular die opening as a primary tube with a tube diameter of around 15 mm. The primary tube was then flattened through nip rolls and conditioned in a water bath, at a water temperature of 75 to 85° C. It was then reinflated to form a secondary tube or bubble between two pairs of nip rolls. Running the two pairs of nip rolls at different speeds imparted stretching of the tube in machine direction. At the same time, this secondary tube expanded under internal pressure (transverse direction), resulting in a tube diameter of approximately 50 mm. The stretched film was then annealed in-line in order to dimensionally stabilize the film in both, machine and transverse direction. In the annealing step (so-called thermofixation), the flattened film was once again inflated to form a bubble and heated by means of water vapor at a temperature of 100° C. After the thermofixation step, the tube diameter was between 40 and 45 mm. After the annealing step, the tube was flattened and wound up on a wind-up reel.

The moisture vapor transmission rate ($MVTR_{98}$) of these films were measured according to ASTM E398 at a temperature of 38° C. and a relative humidity of 85%. Two measurements were made. The average value was extracted and calculated for a thickness of 25 microns. The results are collected in the following Table II:

TABLE II

| Film | 1 | 2 | 3 | 4 |
|---|---|---|---|---|
| $MVTR_{98}$ in $g/m^2 \times 24$ h | 234 | 238 | 244 | 231 |

These results show that the films of the invention had good permeabilities at 38° C.

EXAMPLE 2

Composition 5: the same composition as composition 2 was prepared but Elastomer 1 was replaced by Elastomer 2. A film was prepared according to the same method as in Example 1. The moisture vapor transmission rate ($MVTR_{98}$), measured with the same method as in Example 1, was determined to be 251 $g/m^2 \times 24$ h.

EXAMPLE 3

The following compositions were prepared as dry blends by thoroughly mixing pellets of the two components.

All amounts in Table III are given in parts by weight relative to the total weight of the composition.

TABLE III

| Composition | 6 | 7 |
|---|---|---|
| Aliphatic polyamide 2 | 65 | 75 |
| Elastomer 1 | 30 | 20 |
| Partially aromatic polyamide 1 | 5 | 5 |

For each composition, a blown film was extruded through the same double bubble blown extrusion process as in Example 1. The results were as follows in Table IV:

TABLE IV

| Film | 6 | 7 |
|---|---|---|
| $MVTR_{98}$ in $g/m^2 \times 24$ h | 213 | 171 |

EXAMPLE 4

The E-modulus, or modulus of elasticity, is the rate of tensile stress to corresponding strain below the proportional limit. It is conventionally determined as the slope of the tangent to the stress-strain curve at the beginning at a standardized rate of strain. The greater the E-modulus of the film, the better the mechanical properties, in particular the dimensional stability. The E-modulus of the films obtained from compositions 2, 4–7 were measured according to the ASTM D882-91 method on an extensiometer ZWICK 2.5 with the following parameters:

E-modulus speed 10 mm/min
Test speed: 508 mm/min
Grid separation: 50.8 mm
The results are collected in the following Table V:

TABLE V

| Film | 2 | 4 | 5 | 6 | 7 |
|---|---|---|---|---|---|
| E-modulus in MPa | 1110 | 898 | 782 | 1384 | 1707 |

These results show that with a blend of an aliphatic polyamide and a partially aromatic polyamide according to the invention (films 6 and 7), it was possible to obtain a film having good mechanical properties such as dimensional stability, as well as good permeability.

EXAMPLE 5

The following compositions were prepared as dry blends by thoroughly mixing pellets of the two components.

All amounts in Table VI are given in parts by weight relative to the total weight of the composition.

TABLE VI

| Composition | 8 | 9 | 10 | 11 | 12 | 13 |
|---|---|---|---|---|---|---|
| Aliphatic polyamide 1 | 75 | 70 | | | | |
| Aliphatic polyamide 3 | | | | | | |
| Aliphatic polyamide 4 | | | 100 | 77 | 72 | 67 |
| Elastomer 1 | 25 | 30 | | | | |
| Elastomer 2 | | | | 20 | 25 | 30 |
| Antiblock agent | | | | 3 | 3 | 3 |

For each composition, a film was prepared according to the same method as in Example 1.

The moisture vapor transmission rate ($MVTR_{49}$) of these films were measured according to ASTM F1249 at a temperature of 37.8° C. and a relative humidity of 100%. The testing was done on a Permatran W600 from the company Mocon with the high transmitter switched on. The samples were masked to 5 centimeter diameter. For each sample, the average of two measurements was extracted ("$MVTR_{49}$ Ave" in the table below) and then calculated for a thickness of 25 microns ("$MVTR_{49}$ Ave/25 $\mu$" in the table below). The results are collected in the following Table VII (inv. means "invention" and comp. means "comparative"):

TABLE VII

| Film | 8 (inv.) | 9 (inv.) | 10 (comp.) | 11 (inv.) | 12 (inv.) | 13 (inv.) |
|---|---|---|---|---|---|---|
| Film thickness in microns | 21 | 39 | 23 | 25 | 24 | 27 |
| $MVTR_{49}$ in g/m² × 24 h Ave | 1007 | 642 | 752 | 805 | 1016 | 764 |
| $MVTR_{49}$ in g/m² × 24 h Ave/25 $\mu$ | 845 | 1002 | 689 | 799 | 975 | 834 |

EXAMPLE 6

A compound was prepared by melt blending Aliphatic polyamide 3 in an amount of 80 weight % and Elastomer 2 in an amount of 20 weight %. From this compound, a film was then prepared according to the method described in Example 1. The film thickness was 31 microns. The $MVTR_{49}$ of this film was measured according to the method described in Example 5. The $MVTR_{49}$ in g/m²×24 h Ave was: 672. The $MVTR_{49}$ in g/m²×24 h Ave/25 $\mu$ was: 819.

EXAMPLE 7

The water vapor transmission rate was measured depending on the temperature for Films 8, 10, 12. The water vapor transmission rate was measured according to the following method for a relative humidity of 95% and calculated for a film thickness if 25 microns:

1. A glass test dish of 100 ml volume was filled for measurements with 25 g of freshly dried molecular sieves. The round, polished rim of the dish had an inner diameter of 50 mm, so that the permeation surface was 19.625 cm².
2. For measurements, the dish filled with molecular sieves was closed with the tested film. A round rubber gasket and a rigid ring on top of it pressed the film tightly against the polished rim which was covered with silicon grease.
3. For each sample film, 4 closed dishes (3 for the sample and one dummy to observe possible saturation of moisture pick up by molecular sieves) were placed into a tightly closed desiccator over saturated aqueous solution of $Na_2HPO_4$, which provides constant relative humidity of 95%.
4. For measurement of permeability in ambient temperature, around 18° C., the desiccator with dishes was left on the lab table. For measurements in elevated temperatures, that is respectively 40° C., 60° C. and 80° C., the desiccator placed in an oven with temperature control +/−1° C.
5. Prior to placing them in the desiccator, the closed dishes were weighted with accuracy to 3 digit after period (i.e. to nearest 10 mg), thus obtaining $W_0$ (in grams). Next measurements were made after 1 day (24 h), 2 days (48 h) and 3 days (72 h) giving $W_1$, $W_2$ and $W_3$.
6. The time elapsed between $W_0$ and $W_1$ is lag time or initiation time, after which permeation as the function of time becomes linear.

Calculation of the results: the water vapor transmission rate after a given time is obtained by the following formula:

$$WVTR_i = \frac{(W_i - W_1) \times 10000 \text{ cm}^2 \times 24 \text{ h}}{19.625 \text{ cm}^2 \times (t_i - t_1)}$$

wherein i is either 2 or 3.

The result for an individual sample is the average of $WVTR_2$ and $WVTR_3$. The result for a given structure is an average of the results obtained for 3 samples. The results are collected in the following Table VIII:

TABLE VIII

| | Water vapor transmission rate in g/m² × 24 h, 95% RH, 25 $\mu$ | | |
|---|---|---|---|
| Temperature (° C.) | Film 10 (comparative) | Film 8 (invention) | Film 12 (invention) |
| 18 | 66 | 75 | 71 |
| 40 | 179 | 264 | 385 |
| 60 | 754 | 938 | 1010 |
| 80 | 1620 | 2160 | 2050 |
| Multiplying Factor from 18° C. to 80° C. | 24.54 | 28.8 | 28.9 |

The multiplying factor from 18° C. to 80° C. is increased by 17.5% (from 24.54 to 28.85) between the comparative film (Film 10 which comprises only polyamide 6.66) and the films of the invention (Films 8 and 12). This shows that the film of the invention is particularly suitable for smoking products very efficiently. The high water vapor permeability of the film at high temperatures (80° C. and above) allows the smoke to go through the film and come in contact with the product. Then, because of the good barrier properties at low temperature (18° C.), no humidity is lost after cooling.

What is claimed is:

1. An oriented film having a thickness between 10 micrometers and 50 micrometers comprising i) an aliphatic polyamide and ii) a block copolyetherester elastomer.

2. The film of claim 1, wherein the aliphatic polyamide is selected from the group consisting of polyamide 6, polyamide 6.66, and blends and mixtures thereof.

3. The film of claim 1, wherein the aliphatic polyamide has a viscosity ranging from about 140 to about 270 cm³/g measured according to ISO307 at 0.5% in 96% $H_2SO_4$.

4. The film of claim 1, wherein the aliphatic polyamide is present in an amount from about 50 weight % to about 99.9 weight %, relative to the weight of the film.

5. The film of claim 1, wherein the elastomer is one or more copolyetherester(s) having a multiplicity of recurring long-chain ester units and short-chain ester units joined head-to-tail through ester linkages, said long-chain ester units being represented by the formula:

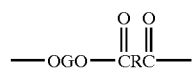

(I)

and said short-chain ester units being represented by the formula:

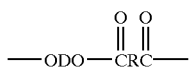

(II)

wherein
- G is a divalent radical remaining after the removal of terminal hydroxyl groups from a poly(alkylene oxide) glycol having an average molecular weight of about 400–3500, wherein the amount of ethylene oxide groups incorporated in said one or more copolyatheresters by the poly(alkylene oxide)glycol is from about 20 to about 68 weight percent based upon the total weight of the copolyetherester(s);
- R is a divalent radical remaining after removal of carboxyl groups from a dicarboxylic acid having a molecular weight less than about 300;
- D is a divalent radical remaining after removal of hydroxyl groups from a diol having a molecular weight less than about 250;

wherein said copolyetherester(s) contain from about 25 to about 80 weight percent short-chain ester units.

6. The film of claim 5, wherein the copolyatherester elastomer contains as repeat units 45 weight percent 1,4-butylene terephthalate, and 55 weight percent ethylene oxide/propylene oxide copolyether terephthalate, for which the copoly(alkylene oxide) glycol used is obtained by end-capping poly(propylene ether) glycol with 64 weight percent ethylene oxide, and has a molecular weight of about 2100.

7. The film of claim 1, wherein the copolyetherester elastomer is present in an amount from about 0.1 weight % to about 50%, relative to the weight of the film.

8. The film of claim 1, wherein the film is biaxially oriented.

9. The film of claim 1, wherein the film has a moisture vapor transmission rate measured according to ASTM E398 at a temperature of 38° C. and a relative humidity of 85% greater than or equal to 100 g/m²×24 h.

10. The film of claim 9, wherein the film has a moisture vapor transmission rate measured according to ASTM E398, at a temperature of 38° C. and a relative humidity of 85% greater than or equal to 200 g/m²×24 h.

11. The film of claim 1, wherein the film has a moisture vapor transmission rate measured according to ASTM F1249 at a temperature of 37.8° C. and a relative humidity of 100%, calculated for a film of 25 microns, greater than or equal to 750 g/m²×24 h.

12. Tubular casing comprising a film according to claim 1.

13. Process of manufacturing an oriented film comprising the steps of:
   a) providing a composition comprising i) an aliphatic polyamide and ii) a block copolyetherester elastomer,
   b) extruding an extrudate of composition of step a), and
   c) quenching and orienting the extrudate of step b) in at least one direction.

14. Process of manufacturing a tubular film comprising the steps of:
   a) providing a composition comprising i) an aliphatic polyamide and ii) a block copolyetherester elastomer, and
   b) processing the composition of step a) through double bubble extrusion to obtain an oriented blown film.

* * * * *